United States Patent [19]

Urano

[11] Patent Number: 5,706,053
[45] Date of Patent: Jan. 6, 1998

[54] COMPRESSED MOTION VIDEO CODE PROCESSOR

[75] Inventor: Takashi Urano, Matsudo, Japan

[73] Assignee: Sanyo Electric Co., Ltd., Moriguchi, Japan

[21] Appl. No.: 534,410

[22] Filed: Sep. 27, 1995

[30] Foreign Application Priority Data

Sep. 29, 1994 [JP] Japan .................................. 6-261583
Oct. 31, 1994 [JP] Japan .................................. 6-292213

[51] Int. Cl.$^6$ .............................. H04N 7/36; H04N 7/50
[52] U.S. Cl. ........................ 348/401; 348/402; 348/415; 348/416
[58] Field of Search .............................. 348/400, 401, 348/402, 415, 416; H04N 7/36, 7/50

[56] References Cited

U.S. PATENT DOCUMENTS

| | | | |
|---|---|---|---|
| 5,231,484 | 7/1993 | Gonzales et al. | 348/405 |
| 5,293,229 | 3/1994 | Iu | 348/415 |
| 5,325,125 | 6/1994 | Naimpally | 348/402 |
| 5,353,059 | 10/1994 | Lawlor | 348/400 |
| 5,386,234 | 1/1995 | Veltman | 348/416 |
| 5,400,076 | 3/1995 | Iwamura | 348/416 |
| 5,436,664 | 7/1995 | Henry | 348/402 |

FOREIGN PATENT DOCUMENTS

| | | |
|---|---|---|
| 5-252507 | 9/1993 | Japan . |
| 5-276502 | 10/1993 | Japan . |
| 6-225284 | 8/1994 | Japan . |
| 6-253288 | 9/1994 | Japan . |

OTHER PUBLICATIONS

"Performance of a Software MPEG Video Decoder", K. Patel et al., Computer Science Division–EECS, Univ. of Calif., Berkeley, CA.

*Primary Examiner*—Howard W. Britton
*Attorney, Agent, or Firm*—Armstrong, Westerman Hattori, McLeland & Naughton

[57] ABSTRACT

A compressed motion video code processing circuit and a compressed motion video code processing method are disclaused. The processor decodes a bitstream into a moving picture data sequence and outputts each picture to an outside circuit (e.g., a monitor circuit) according to the original video sequence. That is, the bitstream includes I-pictures, P-pictures and B-pictures, and each pictures are arranged according to a different rule from the original video sequence. When an error is caused in the bitstream, the data of the error portion is replaced by decoded data of corresponding portion in a correction picture which has been decoded and stored. The correction picture is selected, for example, as a picture which has short inter-frame distance from a current picture under decoding.

21 Claims, 8 Drawing Sheets

Fig.5

COMPRESSED MOTION VIDEO CODE PROCESSOR

BACKGROUND OF THE INVENTION

1. Field of the Invention

The present invention generally relates to a compressed motion video data processing circuit. More particularly, the present invention relates to a compressed moving video picture processor which can decode compressed video code data (e.g., bitstream in conformity to the MPEG Standard) rearranged by changing the order of pictures so that a picture to be referred to precedes in time and then output all the pictures in the order of display. Still more particularly, the present invention relates to processing in case that an error occurs in the bitstreem.

2. Description of the Related Art

In a bitstream in conformity to the MPEG (Moving Picture Experts Group) standard for a motion video picture coding, compressed code data of an I-picture composed only of intra macro-blocks, compressed code data of a P-picture mixedly composed of intra macro-blocks and forward predictive macro-blocks, and compressed code data of a B-picture mixedly composed of intra macro-blocks, forward predictive macro-blocks, backward predictive macro-blocks, and forward and backward predictive macro-blocks are arranged in such a way that the picture to be referred to during the decoding of the forward predictive macro-block, the backward predictive macro-block or the forward and backward predictive macro-block precedes on the time axis. In an MPEG decoder, the video data of each picture is decoded from the MPEG bitstream, and furthermore the decoded pictures are rearranged to be in the order of display on a monitor and then the rearranged pictures are outputted. Therefore, the data to be inputted into the MPEG decoder and the data to be outputted from the MPEG decoder are different in the order of the pictures.

In the MPEG standard, a unit called "GOP (group of picture)" is composed of a plurality of pictures. Generally, the forward prediction referring to the macro-block within the picture which precedes in time, the backward prediction referring to the macro-block within the picture which succeeds in time, and the forward and backward prediction referring to both the macro-block within the picture which precedes in time and the macro-block within the picture which succeeds in time are performed within the same GOP. That is, generally, the picture to be referred to is in the same GOP. However, between GOPs having a correlation to each other, the picture which belongs to the GOP proceeding in time is used as a referential picture ("a referential picture" means a picture to be referred to) in some cases. The GOPs having the correlation to each other means GOPs having continuity therebetween. The presence or absence of the correlation between GOPs is indicated by a closed GOP flag or a broken link flag.

SUMMARY OF THE INVENTION

If an error is caused to a bitstream under the MPEG standard, the degradation in the picture quality due to the error should be minimized. As a means for minimizing the degradation in the picture quality due to the error after decoding, it is conceivable that the decoded data of the error portion is replaced by the decoded data of an image which is resemble to the error portion, as an example. In this case, the image which is resemble to the error portion and an object for replacing the data of the error portion is a corresponding macro-block within the decoded picture, for example.

Figure 3:
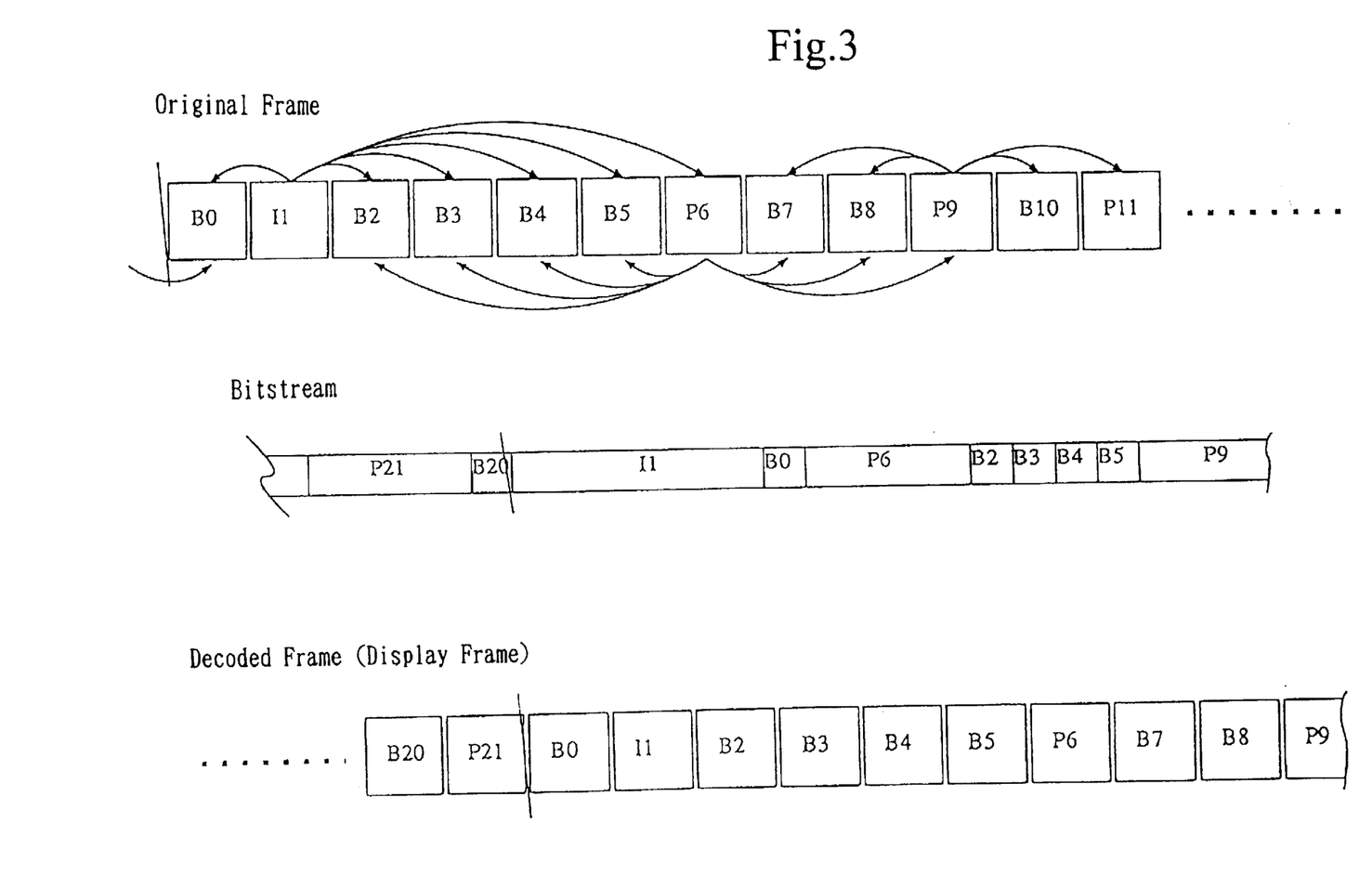
FIG. 3 is a view illustrating the order of the original video picture, the compressed video code input to a MPEG decoder and the video picture output from the MPEG decoder.
Figure 4:
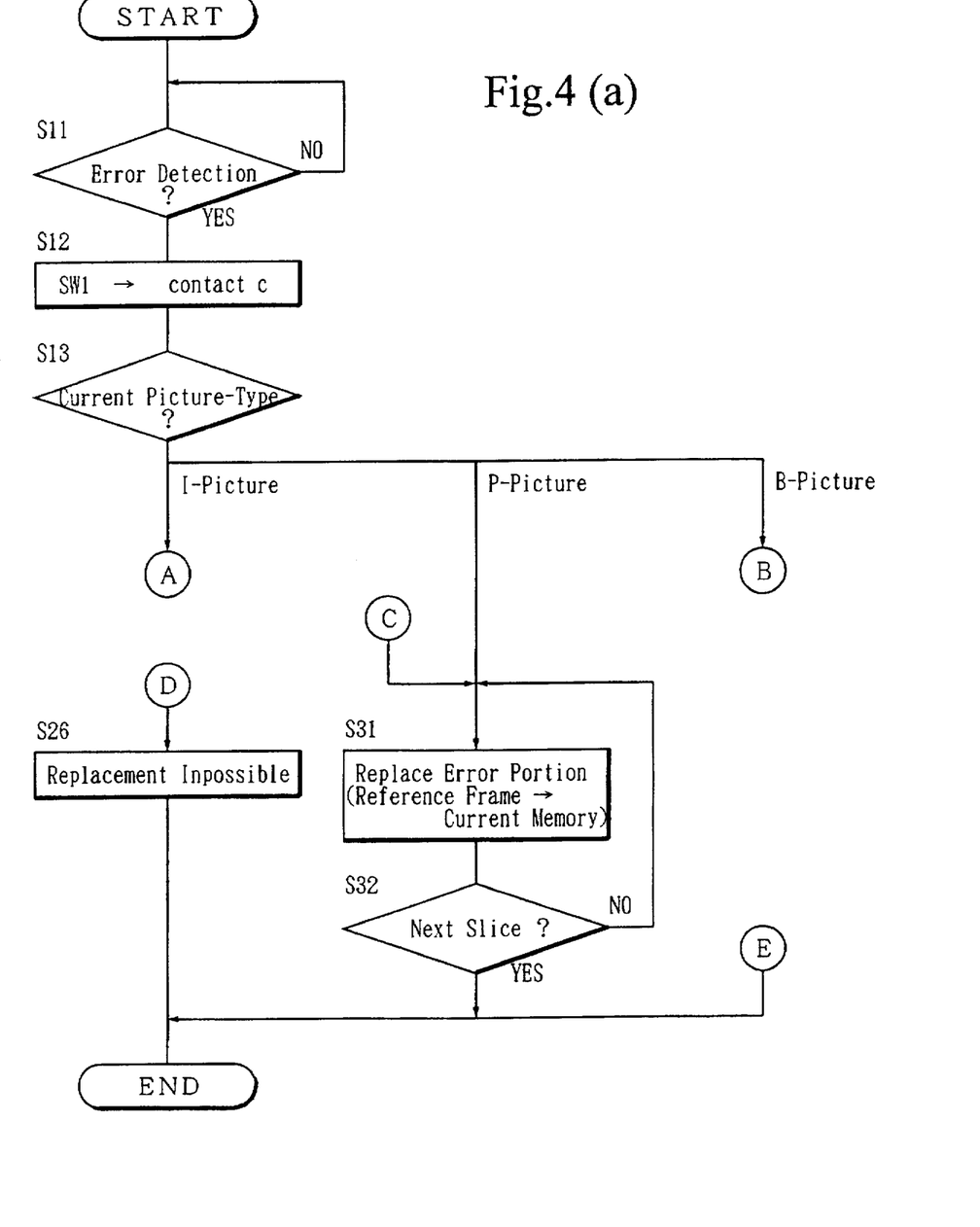
FIGS. 4(a) through 4(d) are flow charts illustrating the processing in the first embodiment.

However, as illustrated in FIG. 3, the order of the pictures within the bitstream to be inputted to the MPEG decoder is different from the order of the pictures to be outputted from the MPEG decoder to be displayed. For this reason, in order to replace the error data by the corresponding data within the decoded picture, the picture for replacing should optimally be selected from among the decoded pictures.

In addition, in the MPEG bitstream, the P-pictures and the B-pictures are decoded referring to other pictures. For this reason, there is a case where the error caused to the referential picture affects the picture (the predictive picture) to be decoded referring to the referential picture and the error is detected only in the predictive picture. In such case, it is not appropriate to compensate the error by using the referential picture having the error, i.e., to use the referential picture as a replacing picture.

In view of the above, the present invention has an object to minimize the degradation in the picture quality due to the error within the MPEG bitstream by optimally specifying the picture as an object for replacing.

EMBODIMENT

Figure 1:
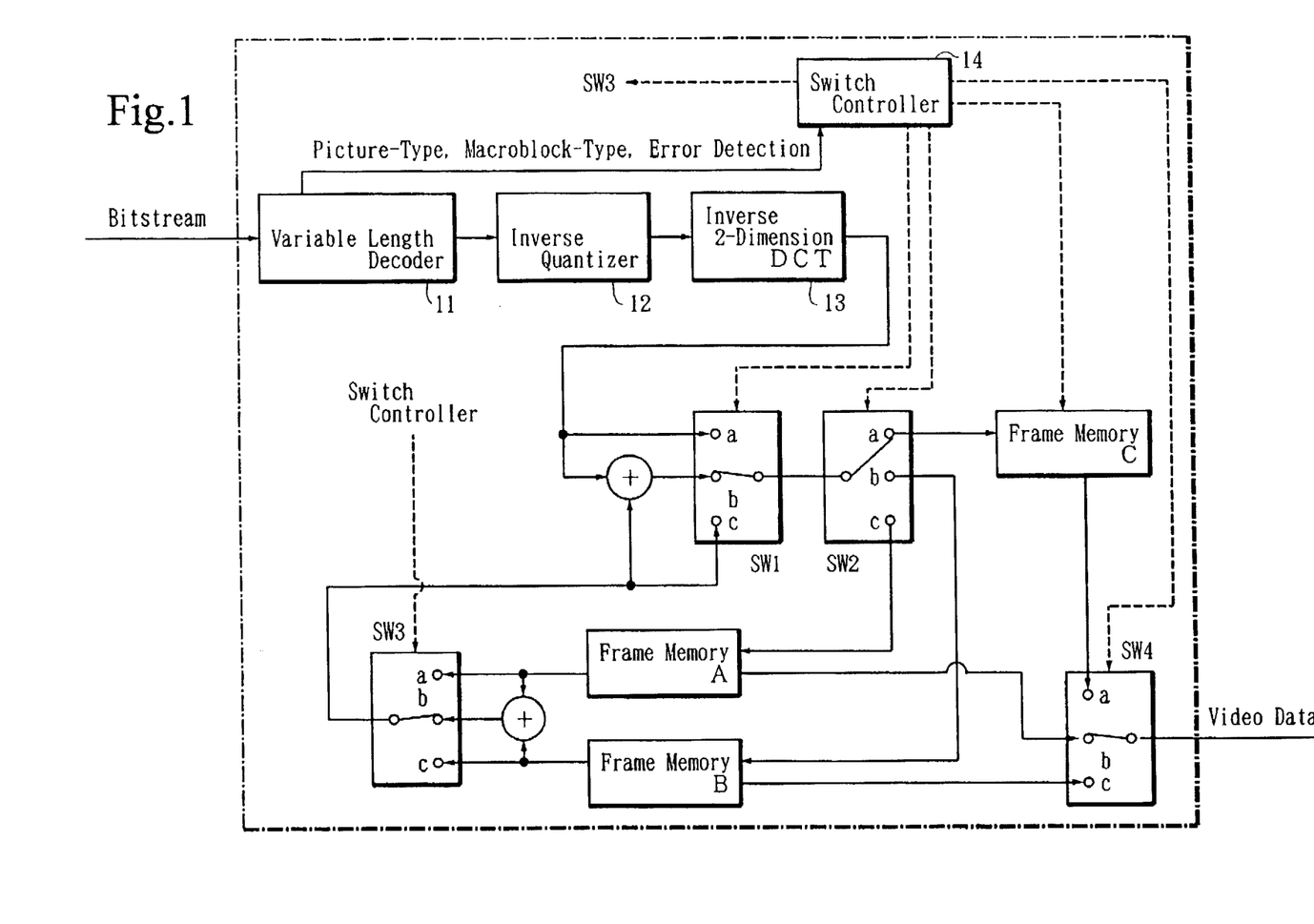
FIG. 1 is a block diagram illustrating the circuit configuration of an embodiment according to the present invention.

A circuit illustrated in FIG. 1 is for use in decoding the MPEG bitstream into the motion video data and outputting the decoded motion video data to a monitor in the sequence to be displayed. In some cases, the MPEG bitstream is received through a communication system or read out of an accumulating media, such as a digital video disk.

In the first place, the normal way of decoding will be described.

The MPEG bitstream to be inputted to the circuit illustrated in FIG. 1 is variably length decoded by a variable length decoder 11, then inversely quantized by an inverse quantizer 12, and then inversely DCT (discrete cosine transformation) processed by an inverse two-dimension DCT processor 13. The current macro-block data outputted from the inverse two-dimension DCT processor 13 is stored into one of frame memories A through C according to the contact position of a switch SW2. If necessary, previously decoded video data in the frame memory A or in the frame memory B is added to the current macro-block data according to the contact position of a switch SW3 and a switch SW1, then the resultant data is stored into one of frame memories A through C according to the contact position of the switch SW2. The switches SW1 through SW3 are controlled by a switch controller 14 according to the picture type and the macro-block type of the current macro-block as described below. The picture type and the macro-block type are detected by the variable length decoder 11 and are sent to the switch controller 14, respectively.

For the I-picture composed only of intra macro-blocks, the switch SW1 is set to the contact a and the switch SW2 is set to either contact b or c. Accordingly, any intra macro-block in the I-picture outputted from the inverse two-dimension DCT processor 13 is stored into either frame memory A or frame memory B. To be more precisely, of these frame memories A and B, the I-picture data is stored into the frame memory which has stored decoded video data earlier.

For the intra macro-block in the P-picture, the switch SW1 and switch SW2 are controlled respectively in the same way as the case for the I-picture. Accordingly, any intra macro-block in the P-picture outputted from the inverse two-dimension DCT processor 13 is stored into either frame memory A or frame memory B whichever that has stored decoded video data earlier. For the forward predictive macro-block in the P picture, while the switch SW2 is set to the same contact (contact b or c) as that of the case for the intra macro-block in the P-picture, the switch SW1 is set to the contact b, and further the switch SW3 is set to the contact a or c. Accordingly, video data in either frame memory A or B whichever that has stored decoded video data later is added to the difference data of the forward predictive macro-block. The difference data is the data outputted from the inverse two-dimension DCT processor 13. As a result, the video data of the forward predictive macro-block is regenerated, and the regenerated video data is stored into the frame memory that has stored decoded video data earlier. The frame memory in which the regenerated video data is stored is the same frame memory as that into which the video data of an intra macro-block within the P-picture is stored.

For the B-picture, the switch SW2 is set to the contact a, and thereby the regenerated video data is stored into the frame memory C. For the intra macro-block in the B-picture, the switch SW1 is set to the contact a, and the video data outputted from the inverse two-dimension DCT processor 13 is stored into the frame memory C. And, for the forward predictive macro-block in the B-picture, the switch SW1 is set to the contact b, and the switch SW3 is set to the contact a or c. Accordingly, the video data in either frame memory A or B whichever that has stored the decoded video data earlier is added to the difference data of the forward predictive macro-block, the difference data being outputted from the inverse two-dimension DCT processor 13, thereby the video data of the forward predictive macro-block is regenerated, and the regenerated video data is stored into the frame memory C. And, for the backward predictive macro-block in the B-picture, while the switch SW1 is set to the contact b in the same way as the case for the forward predictive macro-block in the B picture, the switch SW3 is set to the contact c or a contrary to the case for the forward predictive macro-block in the B-picture. Accordingly, the video data in the frame memory which has stored the decoded video data later is added to the difference data of the backward predictive macro-block, the difference data being outputted from the inverse two-dimension DCT processor 13, thereby the video data of the backward predictive macro-block is regenerated, and the regenerated video data is stored in the frame memory C. Furthermore for the forward and backward predictive macro-block in the B-picture, while the switch SW1 is set to the contact b in the same way as the case for the forward predictive macro-block in the B-picture and the backward predictive macro-block in the B-picture, the switch SW3 is set to the contact b. Accordingly, video data which is the average of the video data in the frame memories A and B is added to the differential data of the forward and backward predictive macro-block, the differential data being outputted from the inverse two-dimension DCT processor 13, thereby the video data of the forward and backward predictive macro-block is regenerated, and the regenerated video data is stored into the frame memory C.

In this way, the video data of the I-picture or P-picture stored into the frame memory A or B and the video data of the B-picture stored into the frame memory C are outputted to a monitor (not shown) in the sequence of display according to the position of the contact of the switch SW4. The switch SW4 is controlled by the switch controller 14.

Next, the processing for a case where an error is detected will be described referring to FIGS. 4(a) through 4(d). Here, it is supposed that an unexpected bit string appeared in the bitstream is detected as the error and the data of the detection is sent to the switch controller 14.

When an error is detected (S11; YES), the switch SW1 is switched to the contact c(S12). That is, preparation is made for replacing the current data (error data) outputted from the inverse two-dimension DCT processor 13 by video data of the corresponding macro-block within the frame memory A or frame memory B.

Then, the type of the picture under decoding is determined (S13).

If it is determined that the I-picture is under decoding, the process proceeds to the step S21, and determination is made whether or not the video data in the frame memory A and the video data in the frame memory B are the video data in the same GOP. If both the video data are in the same GOP (S21; YES) or are not the video data in the same GOP but are in the correlation to each other (closed GOP flag≠1 or broken link flag≠1) (S21; NO and S22; NO), the error data is replaced by the corresponding data within either frame memory A or frame memory B whichever that is not currently being written the video data (S24, S25, S31, S32). For example, if the video data is now being written into the frame memory B (S23; SW2=contact b), the video data within the frame memory A is selected as an image for replacement, the switch SW3 is set to the contact a (S24), thereby the video data of the error portion is replaced by the data of the corresponding portion read out of the frame memory A (S31). This replacement is repeated to the extreme end of a slice to which the error macro-block belongs (S32). On the other hand, if the video data is now being written into the frame memory A (S23; SW2=contact c), the video data within the frame memory B is selected as an image for replacement, the switch SW3 is set to the contact c (S25), thereby the video data of the error portion is replaced by the data of the corresponding portion read out of the frame memory B (S31). This replacement is also repeated to the extreme end of a slice to which the error macro-block belongs (S32).

If the video data within the frame memory A and the video data within the frame memory B are determined not to be in the same GOP (S21; NO), and furthermore both the video data are not in the correlation to each other (S22; YES), as the error compensation by the replacement is impossible, the error compensation is not made (S26). Properly speaking, it may be possible to replace the error portion by a corresponding portion within an another picture, but the picture quality of the replaced data may become worse than that of the non-replaced data. Consequently, the replacement is not made in this embodiment. In this case, it may be possible to compensate the error to interpolate the error data by the luminance data or the color data of the surrounding portion.

If the P-picture is determined to be under decoding in the step S13, the video data of the error portion is replaced by the video data of the corresponding portion within either frame memory A or frame memory B whichever that is not currently being written the video data (S31). This replacement is also repeated to the extreme end of a slice to which the error macro-block belongs (S32), because the error is effected to the extreme end of the slice.

If the B-picture is determined to be under decoding in the step S13, the process proceeds to the step S41. If the picture decoded immediately before is a B-picture (S41; YES), and the B-picture immediately before has no error (S42; YES), and the video data within the frame memories A and B, which are referential pictures of the B-picture immediately before, have no error, either (S43; YES), the video data within the frame memory C is used as it is (S44; S45). That is, the data of the error portion is replaced by the video data of the corresponding portion within the B-picture immediately before.

If it is determined in the step S41 that an I-picture or a P-picture was decoded immediately before (S41; NO), or if it is determined in the step S42 that the B-picture decoded immediately before has an error (S42; NO), or if it is determined in the step S43 that the video data within the frame memory A or B referred to in the B-picture decoded immediately before has an error (S43; NO), the process proceeds to the step S46, and the error data is replaced by the video data of the corresponding portion within a picture which has the shortest inter-frame distance from the B-picture which is under decoding and in which the error was detected.

For example, if the inter-frame distance between the B-picture under decoding and the backward referential frame is the shortest (S46; YES), the error data is replaced by the video data of the corresponding portion within the frame memory (either frame memory A or B) which has stored the backward referential frame (,picture) (S48, S49, S53, S31, S32) on condition that there is no error in the backward referential frame (picture) (S47; YES).

Furthermore, if the inter-frame distance between the B-picture under decoding and the forward referential frame (picture) and the inter-frame distance between the B-picture under decoding and the backward referential frame (picture) are the equivalent to each other, or the inter-frame distance between the B-picture under decoding and the forward referential frame (picture) is the shortest (S46; NO), the error data is replaced by the video data of the corresponding portion within the forward referential frame (picture) (S52, S49, S53, S31, S32) on condition that the forward referential frame (picture) is in the same GOP as that of the B-picture under decoding (S50; YES) or the forward referential frame (picture) is not in the same GOP as that of the B-picture under decoding but is in correlation thereto (S50; NO and S51; NO).

If the forward referential frame is not in the same GOP as that of the B-picture under decoding (S50; NO) and the forward referential frame has no correlation thereto (S51; YES), as the error processing by replacement is impossible, the replacement is not made (S26). Here, in this case, it may be so controlled that the error portion is replaced by the data of the corresponding portion within the backward referential frame.

Figure 2:
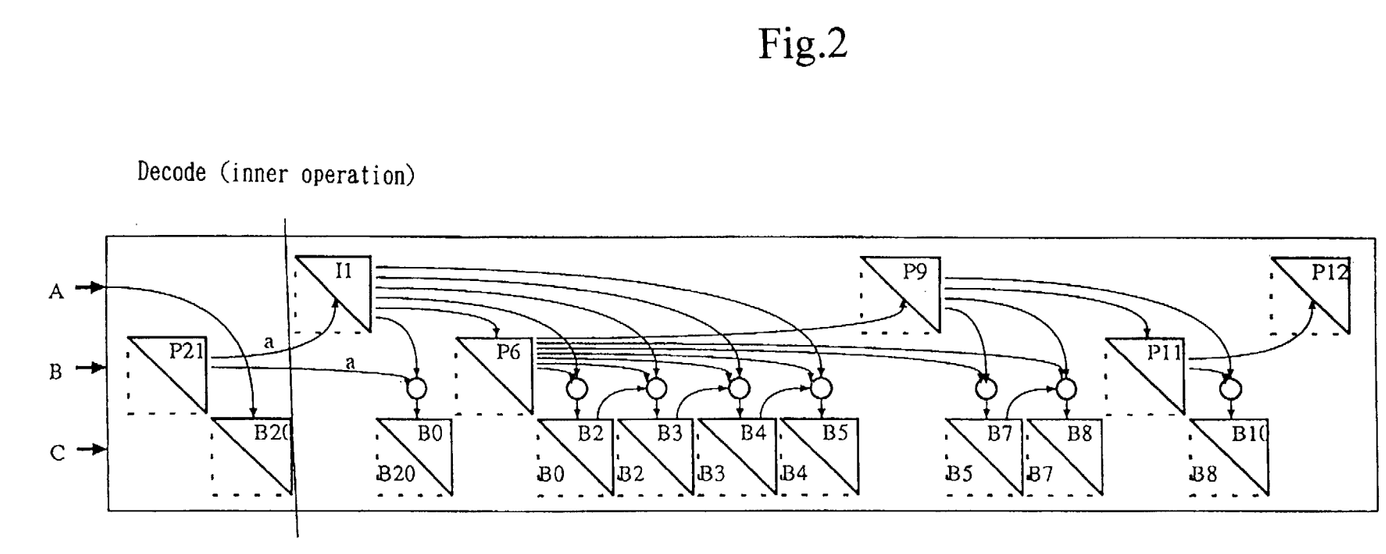
FIG. 2 is a view illustrating an image of replacement processing after the pass of the step S41 in FIG. 4(c) in the first embodiment.

The above processing may be illustrated as FIG. 2. In FIG. 2, the left side is preceding in time, and the right side is succeeding in time, and the arrangement of each picture indicates the arrangement within the MPEG bitstream, which is the compressed code. Here, in the order of display, the smaller the number is, the more preceding the order is, and the B-picture No. indicated within the broken-line frame of each B-picture is the No. of the B-picture stored into the frame memory C immediately before the current B-picture indicated within the full-line frame.

For example, the B7-picture is precedent to the P9-picture in the order of display but succeeding the P9-picture within the bitstream. Of the P9-picture stored within the frame memory A (backward referential frame: referential frame succeeding the B7-picture in time in the order of display) and the P6-picture stored within the frame memory B (forward referential frame: referential frame preceding to the B7-picture in time both in the order of display and the order within the bitstream), the P6-picture is shorter in inter-frame distance from the B7-picture (S46; NO). Therefore, the error data is replaced by the data of the corresponding portion within the P6-picture stored in the frame memory B.

If the B7-picture decoded immediately before has no error (S42; YES) and the P6-picture and the P9-picture, which are the referential frames of the B7-picture, have no error, either (S43; YES), the processing of the B8-picture, which is a frame to be decoded immediately after the B7-picture, is not made (S44). As a result, the error data in the B8-picture is replaced by the data of the corresponding portion in the B7-picture stored within the frame memory C. If the B7-picture decoded immediately before has an error (S42; NO) or at least one of the P9-picture stored within the frame memory A and the P6-picture stored within the frame memory B, both of which are the referential frames of the B7-picture, has an error (S43; NO), the error data is replaced by the data of the corresponding portion within the P9-picture which is shorter in interframe distance from the B8-picture under decoding on condition that the P9-picture has no error (S47;YES).

As the I1-picture is the most preceding frame in the GOP, the frames in preceding GOP have been stored in the frame memories A and B (S21; NO). However, as the preceding GOP is correlated to the current GOP (S22; NO) (the correlation is indicated by "a" in FIG. 2), the error data is replaced by the data of the corresponding portion within the P21-picture stored in the frame memory B, which is the frame memory into which the I1-picture is not currently being written (S23; SW2=c).

For the P6-picture, the error data is replaced by the data of the corresponding portion within the I1-picture, which is the picture stored in the frame memory A, which is the frame memory into which the P6-picture is not currently being written (S23; SW=2), that is, the frame memory to which the P6-picture is currently referring (S31).

In FIG. 2, those cases where B20 proceeds to B0, B0 proceeds to P6, etc. are not illustrated. These choices not illustrated in FIG. 2 are realized only when the processing of the step S41 has been completed. In other words, these choices are removed by the existence of the step S41.

Figure 5:
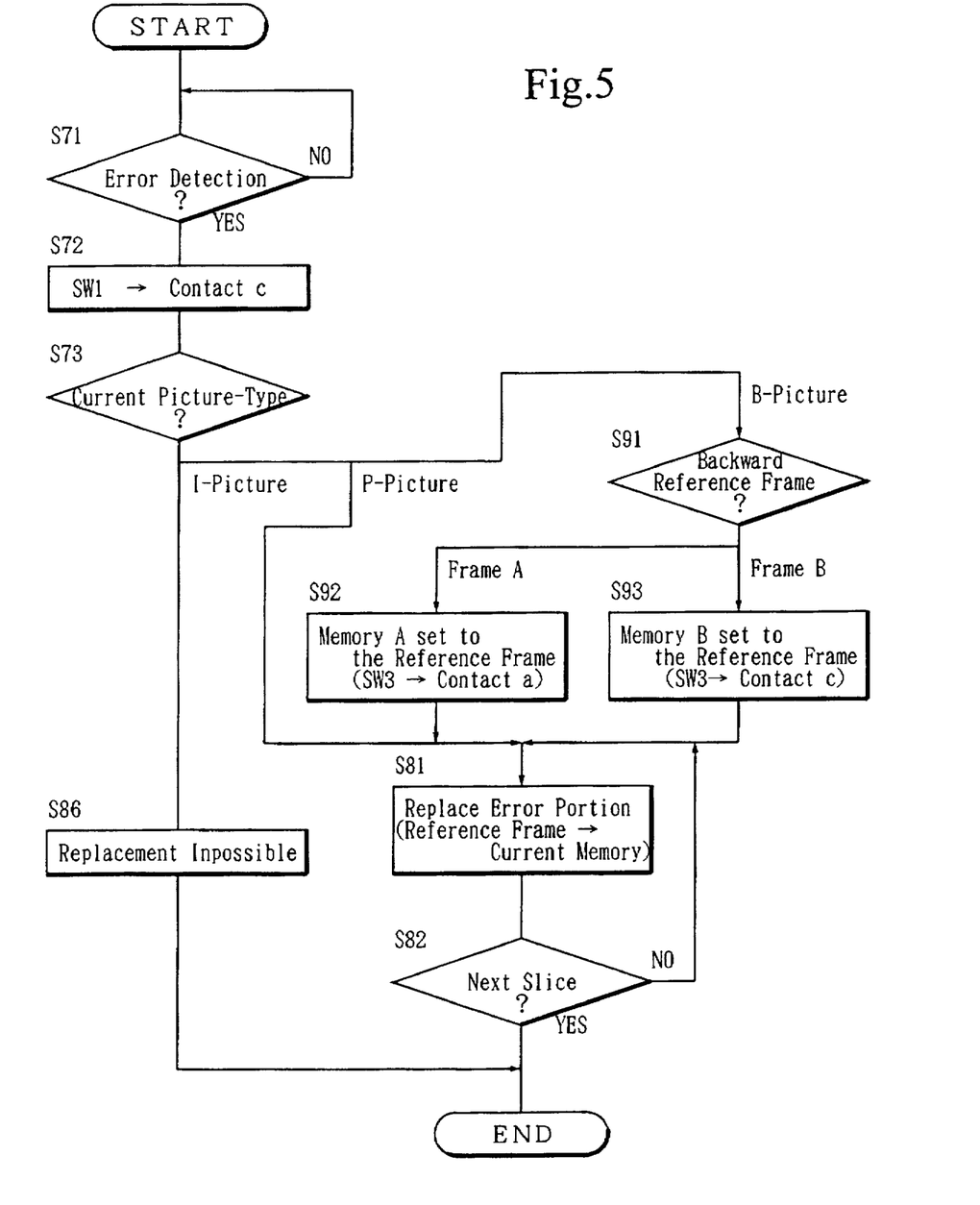
FIG. 5 is a flow chart illustrating the processing in the second embodiment.

Next, the second embodiment will be described referring to FIG. 5.

The steps from the detection of an error to the determination of the picture type (S71–S73) remain the same as those of the first embodiment (S11–S13). Also, the steps for a case where the picture type is the P-picture (S73; P-picture, S81, S82) remain the same as those of the first embodiment (S13; P-picture, S31, S32).

However, according to the second embodiment, if the frame in which an error is detected is the I-picture, the process proceeds direct to the step S86, the error processing by replacement is determined to be impossible, and error processing by replacement is not performed.

Furthermore, in the second embodiment, if the frame in which an error was detected is the B-picture, the error data is replaced by the video data of the corresponding portion in the backward referential frame (S91, S92, S93, S81, S82). That is, if the backward referential frame has been stored in the frame memory A (S91; frame A), the switch SW3 is set to the contact a, thereby video data in the frame memory A is read out (S92), and if the backward referential frame has been stored in the frame memory B (S91; frame B), the switch SW3 is set to the contact c, thereby video data in the frame memory B is read out (S93).

In this way, according to the present invention, the error data is replaced by the optimum data determined according to the picture type of the frame in which the error was detected. Therefore, the degradation in the picture quality due to the error can be minimized. Here, the optimum data means the data of the corresponding portion in the frame which minimizes the inter-frame distance, for example.

I claim:

1. A compressed motion video code processor for decoding a bitstream into a moving picture sequence and outputting each picture to a monitor in the order of display, the bitstream including an I-picture composed only of intra macro-blocks, a P-picture mixedly composed of intra macro-blocks and forward predictive macro-blocks, and a B-picture mixedly composed of intra macro-blocks, forward predictive macro-blocks, a backward predictive macro-blocks and forward and backward predictive macro-blocks, the I-picture, the P-picture and the B-picture being arranged in such a way that a reference picture to be referred to during the decoding of the each predictive macro-blocks of a predictive picture precedes the predictive picture in time, the compressed motion video code processor comprising:

error detecting means for detecting an error in the bitstream; and error processing means for replacing data of the error portion of a current B-picture under decoding by video data of the corresponding portion of a preceding B-picture being decoded immediately before.

2. A compressed motion video code processor for decoding a bitstream into a moving picture sequence and outputting each picture to an outside circuit in the order of display, the bitstream including an I-picture composed only of intra macro-blocks, a P-picture mixedly composed of intra macro-blocks and forward predictive macro-blocks, and a B-picture mixedly composed of intra macro-blocks, forward predictive macro-blocks, a backward predictive macro-blocks and forward and backward predictive macro-blocks, the I-picture, the P-picture and the B-picture being arranged in such a way that a reference picture to be referred to during the decoding of the each predictive macro-blocks of a predictive picture precedes the predictive picture in time, the compressed motion video code processor comprising:

first, second and third frame memories;

writing means for writing decoded video data of an I-picture into the first or second frame memory, writing video data of a P-picture being decoded by referring to video data in the first or second frame memory into the second or first frame memory, and writing video data of a B-picture being decoded by referring to video data in the first and second frame memories into the third frame memory;

reading means for reading video data from the first, the second or the third frame memory in the order of display to output to an outside circuit;

error detecting means for detecting an error in the bitstream; and error processing means for replacing data of the error portion of a current B-picture under decoding by video data of the corresponding portion of a preceding B-picture stored in the third frame memory.

3. A compressed motion video code processor according to claim 2, wherein the error processing means performs the replacement by forbidding the writing means to write data of the error portion into the third frame memory.

4. A compressed motion video code processor according to claim 2, wherein the error processing means:

replaces data of the error portion of the current B-picture by video data of the corresponding portion of the preceding B-picture on condition that the preceding B-picture has not been subjected to the error processing and both video data stored in the first and second frame memories have not been subjected to the error processing; and replaces data of the error portion of the current B-picture by video data of the corresponding portion of a reference picture having the shortest inter-frame distance from the current B-picture, the reference picture being stored in either of the first or second frame memory, on condition that the preceding B-picture has been subjected to the error processing or video data stored in either of the first or second frame memory has been subjected to the error processing.

5. A compressed motion video code processor according to claim 4, wherein the error processing means:

replaces data of the error portion of the current B-picture by video data of the corresponding portion of the reference picture having the shortest inter-frame distance from the current B-picture, the reference picture being stored in either of the first or second frame memory, on condition that the reference picture has not been subjected to the error processing and the reference picture being positioned succeedingly in time in the order of display; and replaces data of the error portion of the current B-picture by video data of the corresponding portion of the reference picture having the shortest inter-frame distance from the current B-picture, the reference picture being stored in either of the first or second frame memory, on condition that the reference picture is in the same GOP or not in the same GOP but is in a correlation thereto and the reference picture being positioned precedingly in time in the order of display.

6. A compressed motion video code processor according to claim 2, wherein the error processing means replaces data of the error portion of the current B-picture by video data of the corresponding portion of the reference picture having the shortest inter-frame distance from the current B-picture, the reference picture being stored in either of the first or second frame memory, on condition that a picture decoded immediately before is a I-picture or a P-picture.

7. A compressed motion video code processor for decoding a bitstream into a moving picture sequence and outputting each picture to an outside circuit in the order of display, the bitstream including an I-picture composed only of intra macro-blocks, a P-picture mixedly composed of intra macro-blocks and forward predictive macro-blocks, and a B-picture mixedly composed of intra macro-blocks, forward predictive macro-blocks, a backward predictive macro-blocks and forward and backward predictive macro-blocks, the I-picture, the P-picture and the B-picture being arranged in such a way that a reference picture to be referred to during the decoding of the each predictive macro-blocks of a predictive picture precedes the predictive picture in time, the compressed motion video code processor comprising:

first, second and third frame memories;

writing means for writing decoded video data of an I-picture into the first or second frame memory, writing video data of a P-picture being decoded by referring to video data in the first or second frame memory into the second or first frame memory, and writing video data of a B-picture being decoded by referring to video data in the first and second frame memories into the third frame memory;

reading means for reading video data from the first, the second or the third frame memory in the order of display to output to an outside circuit;

error detecting means for detecting an error in the bitstream; and error processing means for replacing data of the error portion of a current P-picture under decoding by video data of a corresponding portion of a picture stored in the frame memory in which the video data is not currently being written.

8. A compressed motion video code processor for decoding a bitstream into a moving picture sequence and outputting each picture to an outside circuit in the order of display, the bitstream including an I-picture composed only of intra macro-blocks, a P-picture mixedly composed of intra macro-blocks and forward predictive macro-blocks, and a B-picture mixedly composed of intra macro-blocks, forward predictive macro-blocks, a backward predictive macro-blocks and forward and backward predictive macro-blocks, the I-picture, the P-picture and the B-picture being arranged in such a way that a reference picture to be referred to during the decoding of the each predictive macro-blocks of a predictive picture precedes the predictive picture in time, the compressed motion video code processor comprising:

first, second and third frame memories;

writing means for writing decoded video data of an I-picture into the first or second frame memory, writing video data of a P-picture being decoded by referring to video data in the first or second frame memory into the second or first frame memory, and writing video data of a B-picture being decoded by referring to video data in the first and second frame memories into the third frame memory;

reading means for reading video data from the first, the second or the third frame memory in the order of display to output to an outside circuit;

error detecting means for detecting an error in the bitstream; and error processing means for replacing data of the error portion of a current I-picture under decoding by video data of a corresponding portion of a picture stored in the frame memory in which the video data is not currently being writtenen on condition that a picture in the same GOP or the picture not in the same GOP but has a correlation thereto has been stored in the frame memory.

9. A compressed motion video code processing method for decoding a bitstream into a moving picture sequence and outputting each picture to an outside circuit in the order of display, the bitstream including an I-picture composed only of intra macro-blocks, a P-picture mixedly composed of intra macro-blocks and forward predictive macro-blocks, and a B-picture mixedly composed of intra macro-blocks, forward predictive macro-blocks, a backward predictive macro-blocks and forward and backward predictive macro-blocks, the I-picture, the P-picture and the B-picture being arranged in such a way that a reference picture to be referred to during the decoding of the each predictive macro-blocks of a predictive picture precedes the predictive picture in time, the compressed motion video code processing method comprising the steps of:

writing decoded video data of an I-picture into the first or second frame memory, writing video data of a P-picture being decoded by referring to video data in the first or second frame memory into the second or first frame memory, and writing video data of a B-picture being decoded by referring to video data in the first and second frame memories into the third frame memory;

reading video data from the first, the second or the third frame memory in the order of display to output to an outside circuit; and replacing data of an error portion of a current picture under decoding by video data of a corresponding portion of a picture stored in one of the first, second or third frame memory, the frame memory being selected based on a picture-type of the current picture.

10. A compressed motion video code processing method according to claim 9, wherein the replacing:

replaces data of the error portion of a current I-picture under decoding by video data of a corresponding portion of a picture stored in the frame memory in which the video data is not currently being writtenen on condition that a picture in the same GOP or the picture not in the same GOP but has a correlation thereto has been stored in the frame memory;

replaces data of the error portion of a current P-picture under decoding by video data of a corresponding portion of a picture stored in the frame memory in which the video data is not currently being writtenen; and replaces data of the error portion of the current B-picture by video data of the corresponding portion of the reference picture having the shortest inter-frame distance from the current B-picture, the reference picture being stored in either of the first or second frame memory, on condition that a picture decoded immediately before is a I-picture or a P-picture.

11. A compressed motion video code processing method according to claim 10, wherein the replacing:

replaces data of the error portion of the current B-picture by video data of the corresponding portion of the preceding B-picture on condition that the preceding B-picture has not been subjected to the error processing and both video data stored in the first and second frame memories have not been subjected to the error processing; and replaces data of the error portion of the current B-picture by video data of the corresponding portion of a reference picture having the shortest inter-frame distance from the current B-picture, the reference picture being stored in either of the first or second frame memory, on condition that the preceding B-picture has been subjected to the error processing or video data stored in either of the first or second frame memory has been subjected to the error processing.

12. A compressed motion video code processing method according to claim 11, wherein the replacing:

replaces data of the error portion of the current B-picture by video data of the corresponding portion of the reference picture having the shortest inter-frame distance from the current B-picture, the reference picture being stored in either of the first or second frame memory, on condition that the reference picture has not been subjected to the error processing and the reference picture being positioned succeedingly in time in the order of display; and replaces data of the error portion of the current B-picture by video data of the corresponding portion of the reference picture having the shortest inter-frame distance from the current B-picture, the reference picture being stored in either of the first or second frame memory, on condition that the reference picture is in the same GOP or not in the same GOP but is in a correlation thereto and the reference picture being positioned precedingly in time in the order of display.

13. A compressed motion video code processor for decoding a bitstream into a moving picture sequence and outputting each picture to an outside circuit in the order of display, the bitstream including an I-picture composed only of intra macro-blocks, a P-picture mixedly composed of intra macro-blocks and forward predictive macro-blocks, and a B-picture mixedly composed of intra macro-blocks, forward predictive macro-blocks, a backward predictive macro-blocks and forward and backward predictive macro-blocks, the I-picture, the P-picture and the B-picture being arranged in such a way that a reference picture to be referred to during the decoding of the each predictive macro-blocks of a predictive picture precedes the predictive picture in time, the compressed motion video code processor comprising:

first, second and third frame memories;

writing means for writing decoded video data of an I-picture into the first or second frame memory, writing video data of a P-picture being decoded by referring to video data in the first or second frame memory into the second or first frame memory, and writing video data of a B-picture being decoded by referring to video data in the first and second frame memories into the third frame memory;

reading means for reading video data from the first, the second or the third frame memory in the order of display to output to an outside circuit;

error detecting means for detecting an error in the bitstream; and error processing means for replacing data of the error portion of a current picture under decoding by video data of a corresponding portion of a picture stored in the frame memory in which the video data is not currently being writtenen when the current picture is a P-picture, and replacing data of the error portion of a current picture under decoding by video data of a corresponding portion of a picture being positioned precedingly in time in the order of display and being stored in the frame memory when the current picture is a B-picture.

14. A compressed moving picture processing method for decoding a bitstream into a moving picture data and outputting each picture to an outside circuit in the original video sequence, the pictures in the bitstream are arranged according to a different rule from the original video sequence, the compressed moving picture processing method comprising the steps of:

selecting a correction picture which has a short inter-frame distance from a current picture in the original video sequence; and replacing data of an error portion of the current picture by data of a corresponding portion of the correction picture.

15. A compressed moving picture processing method according to claim 14, wherein the correction picture is selected from among pictures which have been decoded and stored.

16. A compressed moving picture processing method for decoding a bitstream into a moving picture data and outputting each picture to an outside circuit in the original video sequence, the pictures in the bitstream are arranged according to a different rule from the original video sequence, the compressed moving picture processing method comprising the steps of:

selecting a correction picture which is synthesized from pictures which have a short inter-frame distance from the current picture in the original video sequence; and replacing data of an error portion of the current picture by data of a corresponding portion of the correction picture.

17. A compressed motion video code processor for decoding a bitstream into a moving picture sequence and outputting each picture to a monitor in the order of display, the bitstream including an I-picture composed only of intra macro-blocks, a P-picture mixedly composed of intra macro-blocks and forward predictive macro-blocks, and a B-picture mixedly composed of intra macro-blocks, forward predictive macro-blocks, a backward predictive macro-blocks and a forward and backward predictive macro-blocks, the I-picture, the P-picture and the B-picture being arranged in such a way that a reference picture to be referred to during the decoding of the each predictive macro-blocks of a predictive picture precedes the predictive picture in time, the compressed motion video code processor comprising:

an error detector for detecting an error in the bitstream; and an error processor for replacing data of the error portion of a current B-picture under decoding by video data of the corresponding portion of a preceding B-picture being decoded immediately before.

18. A compressed motion video code processor for decoding a bitstream into a moving picture sequence and outputting each picture to an outside circuit in the order of display, the bitstream including an I-picture composed only of intra macro-blocks, a P-picture mixedly composed of intra macro-blocks and forward predictive macro-blocks, and a B-picture mixedly composed of intra macro-blocks, forward predictive macro-blocks, a backward predictive macro-blocks and forward and backward predictive macro-blocks, the I-picture, the P-picture and the B-picture being arranged in such a way that a reference picture to be referred to during the decoding of the each predictive macro-blocks of a predictive picture precedes the predictive picture in time, the compressed motion video code processor comprising:

first, second and third frame memories;

an error detector for detecting an error and its picture-type in the bitstream to generate an error-detection-signal and a picture-type-signal;

plural switches; and a controller for switching the plural switches to write decoded video data of an I-picture into the first or second frame memory, to write video data of a P-picture being decoded by referring to video data in the first or second frame memory into the second or first frame memory, to write video data of a B-picture being decoded by referring to video data in the first and second frame memories into the third frame memory, and not to write video data of a B-picture being decoded by referring to video data in the first and second frame memories into the third frame memory when the error-detection-signal of a B-picture is input from the error detector.

19. A compressed motion video code processor for decoding a bitstream into a moving picture sequence and outputting each picture to an outside circuit in the order of display, the bitstream including an I-picture composed only of intra macro-blocks, a P-picture mixedly composed of intra macro-blocks and forward predictive macro-blocks, and a B-picture mixedly composed of intra macro-blocks, forward predictive macro-blocks, a backward predictive macro-blocks and forward and backward predictive macro-blocks, the I-picture, the P-picture and the B-picture being arranged in such a way that a reference picture to be referred to during the decoding of the each predictive macro-blocks of a predictive picture precedes the predictive picture in time, the compressed motion video code processor comprising:

first, second and third frame memories;

an error detector for detecting an error and its picture-type in the bitstream to generate an error-detection-signal and a picture-type-signal;

plural switches; and a controller for switching the plural switches to write decoded video data of an I-picture into the first or second frame memory, to write video data of a P-picture being decoded by referring to video data in the first or second frame memory into the second or first frame memory, to write video data of a B-picture being decoded by referring to video data in the first and second frame memories into the third frame memory, and to write video data stored in the first or second frame memory in which video data is not currently being written into the second or first frame memory when the error-detection-signal of a P-picture is input from the error detector.

20. A compressed motion video code processor for decoding a bitstream into a moving picture sequence and outputting each picture to an outside circuit in the order of display, the bitstream including an I-picture composed only of intra macro-blocks, a P-picture mixedly composed of intra macro-blocks and forward predictive macro-blocks, and a B-picture mixedly composed of intra macro-blocks, forward predictive macro-blocks, a backward predictive macro-blocks and forward and backward predictive macro-blocks, the I-picture, the P-picture and the B-picture being arranged in such a way that a reference picture to be referred to during the decoding of the each predictive macro-blocks of a predictive picture precedes the predictive picture in time, the compressed motion video code processor comprising:

first, second and third frame memories;

an error detector for detecting an error and its picture-type in the bitstream to generate an error-detection-signal and a picture-type-signal;

plural switches; and a controller for switching the plural switches to write decoded video data of an I-picture into the first or second frame memory, to write video data of a P-picture being decoded by referring to video data in the first or second frame memory into the second or first frame memory, to write video data of a B-picture being decoded by referring to video data in the first and second frame memories into the third frame memory, and to write video data stored in the first or second frame memory in which video data is not currently being written on condition that a picture in the same GOP or the picture not in the same GOP but has a correlation thereto has been stored in the frame memory into the second or first frame memory when the error-detection-signal of an I-picture is input from the error detector.

21. A compressed motion video code processor for decoding a bitstream into a moving picture sequence and outputting each picture to an outside circuit in the order of display, the bitstream including an I-picture composed only of intra macro-blocks, a P-picture mixedly composed of intra macro-blocks and forward predictive macro-blocks, and a B-picture mixedly composed of intra macro-blocks, forward predictive macro-blocks, a backward predictive macro-blocks and forward and backward predictive macro-blocks, the I-picture, the P-picture and the B-picture being arranged in such a way that a reference picture to be referred to during the decoding of the each predictive macro-blocks of a predictive picture precedes the predictive picture in time, the compressed motion video code processor comprising:

first, second and third frame memories;

an error detector for detecting an error and its picture-type in the bitstream to generate an error-detection-signal and a picture-type-signal;

plural switches; and a controller for switching the plural switches to write decoded video data of an I-picture into the first or second frame memory, to write video data of a P-picture being decoded by referring to video data in the first or second frame memory into the second or first frame memory, to write video data of a B-picture being decoded by referring to video data in the first and second frame memories into the third frame memory, and to write video data being positioned precedingly in time in the order of display and being stored in the first or second frame memory in which video data is not currently being written into the second or first frame memory when the error-detection-signal of a B-picture is input from the error detection.

* * * * *